Figure 1:
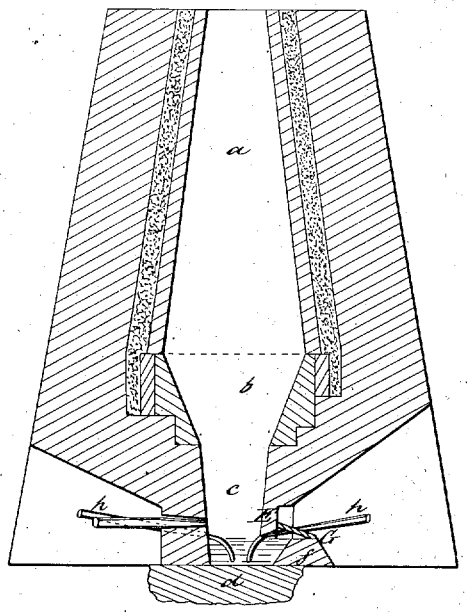

C. Shunk,

Refining Iron,

No. 1,401, Reissued Feb. 10, 1863.

Witnesses
Octavius Knight
James H. Gridley

Inventor
C. Shunk
for Munn & Co
Attys

UNITED STATES PATENT OFFICE.

CHRISTIAN SHUNK, OF CANTON, OHIO.

IMPROVEMENT IN REFINING IRON BY MEANS OF BLASTS OF AIR.

Specification forming part of Letters Patent No. 24,060, dated May 17, 1859; Reissue No. 798, dated August 16, 1859; Reissue No. 1,401, dated February 10, 1863.

*To all whom it may concern:*

Be it known that I, CHRISTIAN SHUNK, formerly of Slate Lick, in the county of Armstrong and State of Pennsylvania, now of Canton, in the county of Stark and State of Ohio, have invented a new and useful process and improvement for treating molten crude iron by the introduction of a current or currents of atmospheric air under pressure forced into and through a mass of crude iron while in a fluid state, so as to combine a perfect admixture of the gaseous matter of the air with the particles of molten crude iron for the purpose of decarbonizing and refining the same into refined iron or steel and malleable semi-steel without the use of fuel to keep up combustion, of which the following is a specification.

My process for decarbonizing and refining crude iron while in a fluid state is accomplished by the agency of the gases of the air, the oxygen combining with the carbon in the crude iron, forming carbonic-acid gas, and increased heat in the molten metal is obtained, and ebullition is accomplished, and a speedy decarbonizing, refining, and steelifying of the crude liquid iron is effected.

It is known that crude pig-iron or molten crude iron contains different degrees or quantities of carbon, which is required to be reduced and expelled in converting the same into refined iron or steel. Therefore, crude pig-iron in a fluid state parts with its carbon by uniting with the oxygen gas of the air, and accomplishes my process, as herein described. It is preferable to select the crude iron which contains the greatest amount of carbon, which practical manufacturers will readily distinguish; or when the crude metal is deficient of the ordinary amount of carbon, which sometimes is the case, a small portion of carbonaceous matter can be added to the fluid iron in the crucible when the refining process is commenced. When the oxygen gas of the air combines with the carbon contained in the crude iron, the heat and fluidity are increased and ebullition takes place. The carbo now combines freely, producing a bright flame at the top of the refining crucible or fire, which increases for a few minutes, then decreases, by which the quality of the product is readily determined by the workmen, first, steel or partially decarbonated and refined iron is obtained when the flame is up, and when the flame drops the product will be soft or semi steel of tenacity and tensile strength, to mold into pig or ingot chills fit for the hammer or the rolls. The soft or semi steel can be molded in mass of any size desired for ordnance or machinery.

During the refining and purifying process by the union of the oxygen gas combining with the carbon of the crude iron, it is supposed the nitrogen gas of the air acts by cementation on the fine particles of fluid iron and produces the different kinds of refined iron or steel or malleable semi-steel, according to the time the blast of air is continued which is indicated by the flame at the top of the refining-fire.

During the refining and purifying process I use a flux or solvent of common salt, which facilitates the refining and steelifying of the crude metal by causing a separation of the impurities contained in the iron. Common salt has heretofore been attempted to be used in some forms of the iron business, but not, to my knowledge, in the manner and for the purpose used by me.

My process for decarbonizing and purifying crude molton iron can be accomplished in the hearth of the common iron-smelting furnace either from the ore or from the remelted pig-iron after a deposit has taken place in the furnace-hearth. If the hearth of the smelting-furnace is used, the refining or auxiliary tuyere-pipe can be introduced at one of the tuyere-arches, or in front, under the tympstone, through an opening in the dam-plate to dip down into the crude metal for the discharge of the air; but it is preferable to run the fluid iron into an outside fire-place or crucible, made of any inconsumable materials, which can be made stationary or movable, and to suit the adaptation of the furnace-hearth. It can be made of plate-iron, lined inside with fire-clay cement or plumbago, or the lower part of which can be lined with fire-clay brick. It is preferable to make this refining-crucible in two parts for the convenience of lining the inside, as well as for cleaning the bottom. The top part is readily attached and removed, when required, by attaching a couple of drop latches or fastenings, and is made with handles for the convenience of the workmen, and can also be made to swing in an iron frame, if desired. On the opposite side from the tuyere-pipe a small opening or tube is made to afford a view of the quantity of metal to be run in to be refined and purified.

For conducting the molton iron into the refining fire or crucible, an iron trough or gutter is connected to the furnace-hearth, lined with clay cement. This conductor is only attached at the time of discharging the fluid metal into the crucible. The refining-crucible must not be made too full, but to allow some space for the metal to rise during the refining process. It is necessary to place in the crucible some live coals, to cause a moderate degree of heat before the fluid metal is run in.

The atmospheric air can be introduced into the refining fire or crucible in different ways, so as to commingle the gases with the mass of metal to be refined and steelified. It is preferable, however, to force the air through one or more tuyere-pipes from the top, and to dip down the nozzle sufficiently into the body of the mass of molten metal, so as to effect a perfect admixture of the gaseous matter of the air with the particles of fluid iron and its carbon to accomplish the decarbonizing and purifying process.

In attaching the refining tuyere pipes or pipe they should dip down into the fluid iron tangentially to the circumference, and thereby cause a rotary motion of the fluid mass of metal by the force and pressure of the blast, which greatly relieves the pressure of the iron from the mouth of the tuyere-pipe, by passing round the same direction with the air as it is forced into the fluid metal; and by giving the molten iron a rapid rotary and spiral motion by the force of the blast, a more speedy ebullition of the mass of iron is effected and a more perfect admixture of the gases of the air with the fine particles of liquid metal and its carbon is obtained than otherwise would be if the blast entered directly against a body of iron standing still. The nozzle of the refining-pipe or openings for the discharge of the air must be of the proper size, so as to well compress the volume of air discharged to cause a rapid force of the blast as it penetrates into the mass of metal to be refined and steelified.

When the refined iron is ready to be discharged from the crucible, a fire-clay plug is removed, placed near the bottom for that purpose; or a properly-constructed valve can be attached for the discharge of the refined iron.

My decarbonizing and refining process requires but a few minutes, according to the quantity of crude metal to be operated on and the volume of air discharged, generally from eight to twenty minutes.

As has been already stated, the process can be carried on either in the hearth of the smelting or remelting furnace, or in a separate refining-crucible of any suitable construction, the latter being preferred.

While not confining myself to either mode or to any particular form of apparatus, I will proceed to describe a way in which it may be used in connection with an ordinary blast-furnace.

Figure 2:
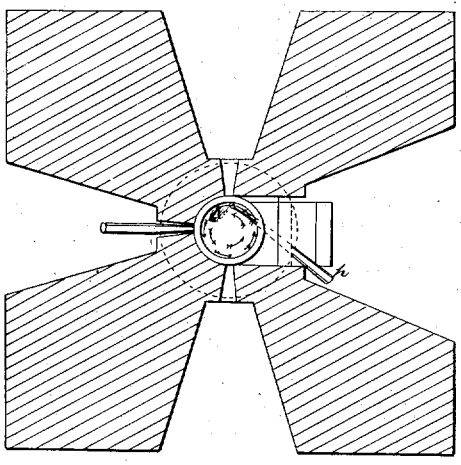

In the accompanying drawings, Figure 1 represents a vertical section of such a furnace; and Fig. 2, a horizontal section of the same, taken through the tuyere-arches and hearth of the furnace.

Similar letters of reference indicate corresponding parts in both views.

No change is made in the shape and position of the upper part or crucible, *a*, the middle portion or boshes, *b*, and the lower part or hearth, *c*, the only alteration required being the formation or one or more additional tuyere-holes for the admission of the auxiliary tuyere-pipe or pipes used for introducing the blast into the iron. The ordinary tuyere-pipes used in the blast-furnaces are not dispensed with, nor is their position or mode of application necessarily varied, excepting that when the refining process is being carried on all the blast is caused to pass through the auxiliary tuyere-pipe or pipes, and is shut off or stopped from passing through the ordinary tuyere-pipes.

To introduce the blast for refining the iron by my process, I use a separate and independent tuyere-pipe, which is introduced into the hearth of the furnace under the tymp-stone in front or at one of the sides, as may be preferred. If it be introduced at one of the sides it is inserted through a tuyere-arch, in a manner similar to the ordinary tuyere-pipes, excepting that the nozzle of the auxiliary tuyere-pipe is much longer and enters into the hearth, (which the nozzle of the ordinary tuyere-pipe does not.) The nozzle of the auxiliary tuyere pipe, after entering the cavity forming the hearth, dips downward to within a short distance of the hearth-stone *d*, so that its mouth is covered by the molten metal. It is preferable to set the nozzle of the auxiliary tuyere-pipe at such an angle as that the blast of air entering the iron may strike the wall of the hearth at (as nearly as possible) a line tangential thereto, so as to expend its force more effectually in causing the molten metal to rotate in the hearth, and to become more diffused through it, as every particle of iron thus moved around must come in contact with the blast of air and a more certain commingling of them produced. The rotary motion thus given to the molten metal in the hearth greatly relieves the pressure against the incoming blast, as the motion of the metal is in the same direction in which the blast enters and the force of the blast is cumulative on the iron when the latter is once set in motion.

The auxiliary tuyere *h*, as shown in Fig. 2, is represented as being rather a chord or secant of the circle drawn within the hearth than a tangent; but that is about the right inclination to effect a rapid rotation of the metal in the hearth. If the auxiliary tuyere-pipe is to be introduced in front of the furnace, it is done by inserting it through the small opening between the lower front edge of the tymp-stone E and the top of the dam-stone *f*, in which case a movable tymp-plate, G, is placed over the dam *f*, covering the aperture between the tymp-stone and the dam-stone. The auxiliary pipe is inserted in an opening of convenient size in said plate G, so as to penetrate the liquid metal, near the bottom of the furnace-hearth, and this plate may be swung out of the way when the refining process is over. It will thus be seen that my improvement, though very important in its results, requires so little alteration in the construction and arrangement of the ordinary blast-furnace as to be easily and cheaply introduced into practical operation. After the charge of iron has run down into the hearth of the blast-furnace, (the smelting process being carried on in the usual way,) and when the molten metal is ready, according to the ordinary process, to be run out into pigs, my refining process is commenced. The auxiliary tuyere pipe or pipes are now introduced into the molten iron, and the whole blast of air used for the blast-furnace is now diverted from the ordinary tuyere-pipes and caused to pass with great force and pressure through the auxiliary tuyere pipe or pipes *h h*. The refining tuyere-pipes I make of plumbago, or plumbago and pure silex, or pure fire-clay cement, to resist the action of the molten iron. The blast can be used either hot or cold.

Blowing air for blast into the refinery or runout fire with the use of coke or coal for fuel has been practiced before.

What I claim as my discovery and invention, and for which I desire to obtain Letters Patent, is—

1. Blowing atmospheric air into and through a mass of molten crude iron from the ore or from the remelted pig-iron, to commingle the gases of the air with the particles of fluid iron and its carbon, for the purpose of decarbonizing and converting the same into refined iron or steel and malleable semi-steel without the use of fuel to keep up combustion, such conversion being effected by the gaseous matter of the atmosphere.

2. Imparting a rotary or spiral motion to the molten iron by or during the introduction of the air-blast, substantially as set forth.

3. The application of the flux or solvent, in the manner and for the purpose herein described, during the atmospheric refining process.

CHRISTIAN SHUNK.

Witnesses:
EDM. F. BROWN,
OCTAVIUS KNIGHT.